United States Patent [19]

Enokido et al.

[11] Patent Number: 4,670,751

[45] Date of Patent: Jun. 2, 1987

[54] ERASER FOR ELECTRONIC BLACKBOARD

[75] Inventors: Shunji Enokido, Yokohama; Hideyuki Kodani, Kawasaki; Hajime Ohta, Yokohama, all of Japan

[73] Assignee: Fujitsu Limited, Kawasaki, Japan

[21] Appl. No.: 568,807

[22] Filed: Jan. 6, 1984

[30] Foreign Application Priority Data

Jan. 8, 1983 [JP] Japan ........................ 58-482[U]

[51] Int. Cl.$^4$ .............................................. G09G 1/16
[52] U.S. Cl. ...................................... 340/706; 178/18;
235/472; 340/707; 340/709
[58] Field of Search ............... 340/706, 707, 708, 709, 340/710; 178/18-20; 235/472

[56] References Cited

U.S. PATENT DOCUMENTS

| | | | |
|---|---|---|---|
| 3,413,515 | 11/1968 | Haring | 340/707 |
| 3,498,692 | 3/1970 | Jewitt et al. | 340/707 |
| 3,758,717 | 9/1973 | Granzotti | 340/707 |
| 4,263,592 | 4/1981 | Takahashi et al. | 340/707 |
| 4,289,927 | 9/1981 | Rodgers | 178/19 |
| 4,317,956 | 3/1982 | Torok et al. | 340/709 |
| 4,472,710 | 9/1984 | Suzuki et al. | 340/708 |
| 4,501,931 | 2/1985 | Ohya et al. | 340/709 |

FOREIGN PATENT DOCUMENTS 58-45069 10/1983 Japan.

OTHER PUBLICATIONS

"Gemini 100 Electronic Blackboard Because Seeing is Believing", AT&T International, 9/82.
"FACOM 2260 OA Board System", Fujitsu Limited, Japan.

Primary Examiner—Marshall M. Curtis
Attorney, Agent, or Firm—Staas & Halsey

[57] ABSTRACT

An eraser for an electronic blackboard. System whose erasing area is variable according to the size and accuracy of the figure to be erased. The eraser includes a main unit carrying a small area erasing unit, and a large area erasing unit which is detachably engaged to the main unit. Detectors installed in the main unit detect when the eraser is touched on the surface of the board, and/or that the large area erasing unit is being used, and send an appropriate signal to the system controller.

When the system controller receive the signal, it blanks the memories corresponding to the area covered by the erasing units and erases the corresponding area of figures displayed on the display unit.

17 Claims, 5 Drawing Figures

ERASER FOR ELECTRONIC BLACKBOARD

BACKGROUND OF THE INVENTION

This invention relates to an electronic blackboard, especially to an eraser used for it and more particularly the present invention provides an eraser which has a variable erasing area.

An electronic blackboard is a device developed for displaying a signal, written by hand on an input board using a hand-held input instrument, on an electronic display unit. Such a device has been proposed for use in a conference system by interconnecting isolated conference rooms using telephone lines etc. Such a system is beginning to be put into actual use under trade names "Gemini 100" by AT&T or "OA Board" by Fujitsu Ltd. etc.

The electronic blackboard detects the positional coordinates of the hand-held input instrument, such as chalk, pencil, felt pen or some special input instrument, when it contacts the surface of the input board (such an input board is sometimes called as digitizer). The coordinates of the touched points are detected and stored in a memory or transmitted to a display unit, and the trace of touched points (figures) are displayed on the display unit.

Electronic blackboard systems can be roughly classified into two kinds by the method of how detection of the coordinates of touched points occurs. One is a pressure sensing type, which detects the contact point of the hand-held instrument on the input board by using a pressure sensitive board. The other is an electro magnetic types which can be further classified into electric and magnetic type, according to whether the coordinate detection is performed by electric or magnetic coupling of the detector to the electronic blackboard or input board.

The electromagntic detection type can be further classified into two types. One is an active board and passive pen type system, that is a position signal is generated by the the input board (active board) and detected by the pen or eraser (passive pen). The other one is a passive board and active pen type system, that is the pen or eraser generates a signal (active pen) detected by the input board (passive board).

The present invention is related to an eraser used for erasing a figure written on the surface of the input board, and blanking the locations in a memory corresponding to the erased part of the figure, to erase the corresponding part of the figure displayed on display unit. It is especially intended to provide a new eraser, whose erasing area can be varied for user convenience to erase a large or small area of the displayed figure.

The following explanation will be given with respect to a magnetic type electronic blackboard, and especially with respect to an active board and passive pen type system. However the explanation is essentially the same for the other types of systems, and can be extended to any type of electronic blackboards except the method of detecting the positional coordinate of the input instrument or eraser on the surface of the input board.

The essential parts of a magnetic type electronic blackboard are shown in FIG. 1. In a blackboard (tabulator of figures written on an input board) 1 is installed a number of coils arranged in X and Y directions with the interval between the coils depending upon the desired resolution. The coils are fabricated usually by printed circuit technology and are called X-coils 2 and Y-coils 3 respectively, according to their direction of arrangement as shown in FIG. 1. These x-coils 2 and Y-coils 3 are excited using electric current and generate magnetic fields at specified intervals in the order of the X and Y directions. When a figure or letter 6 is written on the board 1 (it is not necessarily black in color) using a felt pen 5, a detection coil 4 installed in the felt pen 5, detects the magnetic field emanation from the surface of the board. From the timing or phase of the magnetic field detected by the coil 4, the positional coordinate of the felt pen 5 on the board 1 is detected and the FIG. 6' written on the board 1, can be shown on a display unit 7.

An eraser for such a system is similar to the input pen. When the figure on the input board is erased by hand with an eraser having a felt point for example, a detection coil installed in the eraser detects the magnetic field produced by the input board. The positional coordinates of the eraser are detected in the same way as those of the input pen, and the memory locations corresponding to the trace of contacted points by the eraser on the surface of the input board (that is the part of the figure erased by the eraser) are blanked or cleared. Thus the corresponding part of figure on the display unit is erased.

When using the prior art electronic blackboard, the person who uses the blackboard eraser experiences inconvenience when erasing figures because the point of the eraser is fixed to an appropriate size or area, and if the person wants to erase a large area, he has to use the eraser many times. However, if he wants to erase a fine or sharp figure, a wrong part can be erased by the improperly large eraser. And if the user tries to erase a fine figure by leaning the eraser on its edge similar to when using a general blackboard eraser, errors occur in positional detection and the displayed figure can be deleted incorrectly.

Simple method of responding this problem is provide two erasers, large and small. However this method results in an increased number of components and an increased in cost. The inconvenience caused by the need of changing the eraser in hand is not overcome.

SUMMARY OF THE INVENTION

An object of the present invention, therefore, is to improve or avoid the above mentioned inconveniences and to provide a new type of eraser for an electronic blackboard which is able to change the size of its erasing area, for erasing large or a small area of the figure.

Another object of the present invention is to provide an eraser for electronic blackboard which is convenient for practical use.

The objects can be attained by providing a detachable large area eraser for erasing a large area, at the top of the fine area eraser, and providing a means to detect whether the large area eraser is being used. Based on this detection, the area to be deleted on the display unit can be controlled.

The eraser of the present invention comprises a main unit, a small area erasing unit attached to the main unit, a position sensor installed in the main unit and a detachable large area erasing unit.

A sensor to detect whether the large area eraser unit is attached comprises, for example a lead relay, which is switched by the magnetic field of a permanent magnet installed in the large area eraser unit.

These together with other objects and advantages, which will be subsequently apparent, reside in the details of construction and operation as fully hereinafter described and claimed.

BRIEF DESCRIPTION OF THE DRAWINGS

FIG. 2 (b) is a cross-sectional view of the eraser of FIG. 2 (a), illustrating its essential parts, when a large area erasing unit is attached;

Like reference numerals designate like or corresponding parts throughout the figures.

DESCRIPTION OF THE PREFERRED EMBODIMENTS

As mentioned above, two kinds of erasers are required for the convenience of the user, in order to erase a figure written on an electronic blackboard. One for erasing a small area (fine) and another for erasing a large area.

One method of responding to this requirement is provide a large eraser attachable to a small (fine) eraser. The erasing process is similar to that described before. Namely, the positional coordinates of the center of the eraser touching the surface of the input board are detected, and the memory locations associated with and around the center of the radius of the eraser is blanked or cleared. Thus the figure corresponding to this part on the display unit is erased.

In this method it is necessary to detect whether the large area eraser is in use to determine the radius to blanked in the memory. There were some experiments conducted to discover the best method to determine what size eraser investigated was in use. One method is to make a holder for the large area eraser, and keep the large area eraser in the holder when it is not in use. The use of large area eraser is detected by the holder. That is, if the eraser is not in the holder, it is in use and a large area erasing signal is sent to the controller. However it was noted as troublesome for a lecturer to return the eraser back to the holder and if he concentrated on his lecture, the eraser was often not returned to the holder, and caused trouble due to erroneous operation.

So, it was determined that it is necessary to detect the use of an attachable large area eraser unit by using the eraser itself.

Figure 2A:
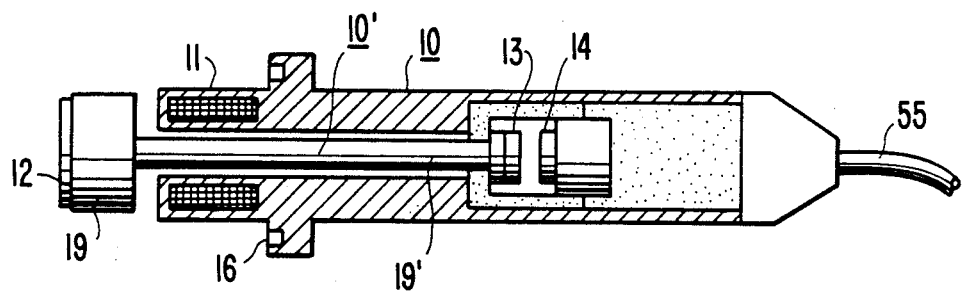
FIG. 2 (a) is a cross-sectional view of an eraser for an electronic blackboard according to the present invention, illustrating its essential parts, when a large area erasing unit is not attached.

FIG. 2 illustrates a structure of an eraser according to the present invention. FIG. 2 (a) shows a condition when the eraser for the large area is not attached, and 2(b) shows a case when the large area eraser is attached. The figure shows only the essential parts of the invention. The eraser comprised a main unit 10, a small area erasing unit 10' and large area erasing unit 10" made from a non-magnetic material. It is to use a lightweight material such as plastic to reduce the weight and to make the handling easy. Material to be used is all similar for all the embodiments which will be described hereinafter. The main unit 10 (hand held rod) is provided with a detection coil 11 and contact points 13 and 14, which are separated from each other by a separating device which will be explained later with regard to FIG. 4. The small area erasing unit 10' comprises a small area eraser 12, attached to the surface of eraser head 19 and supported by a rod 19' which is inserted into the main unit 10, and held in a manner slidable along its axis. Of course the rod 19 is prevented from slipping out of the main unit 10 by a retaining device. However these mechanism are not essential to the present invention, and have been omitted from the explanation and drawings hereinafter.

The large area erasing unit 10" is detachably fitted to the main unit 10. And a large area eraser 15 is attached to the surface of large area erasing unit 10" as shown in FIG. 2(b).

The small area eraser 12 and the large area eraser 15 are made of felt or rubber, for example, and are used to erase figures written on the surface of the electronic blackboard (not shown). The size and material of the erasers depends on what kind of material is used to write figures on the electronic blackboard, and the size and/or accuracy of figures to be erased. The shape of the eraser may be freely chosen but circular shape is preferable for the reasons set forth hereinafter.

The contact points 13 and 14 are closed by pressure transmitted by rod 19' attached to the small eraser unit 10', when the small area eraser 12 is touched to the surface of the input board, and send an erasing signal to a control unit or the display unit.

Figure 2B:
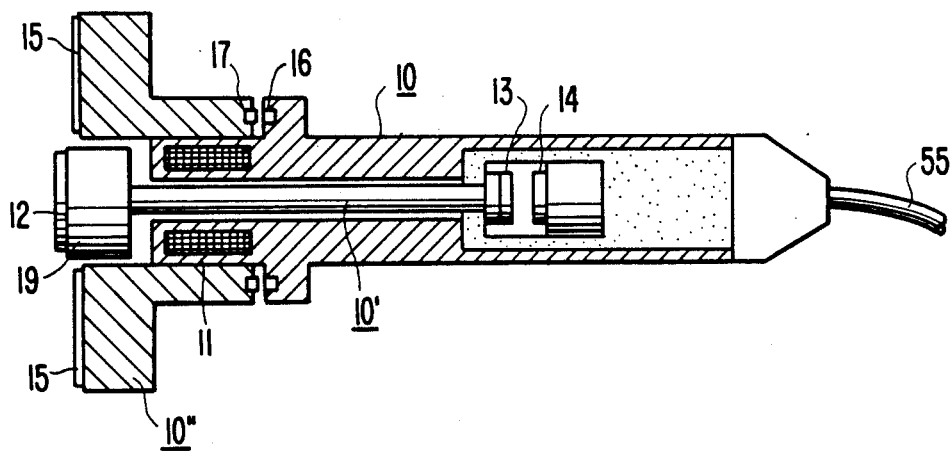
Figure 5:
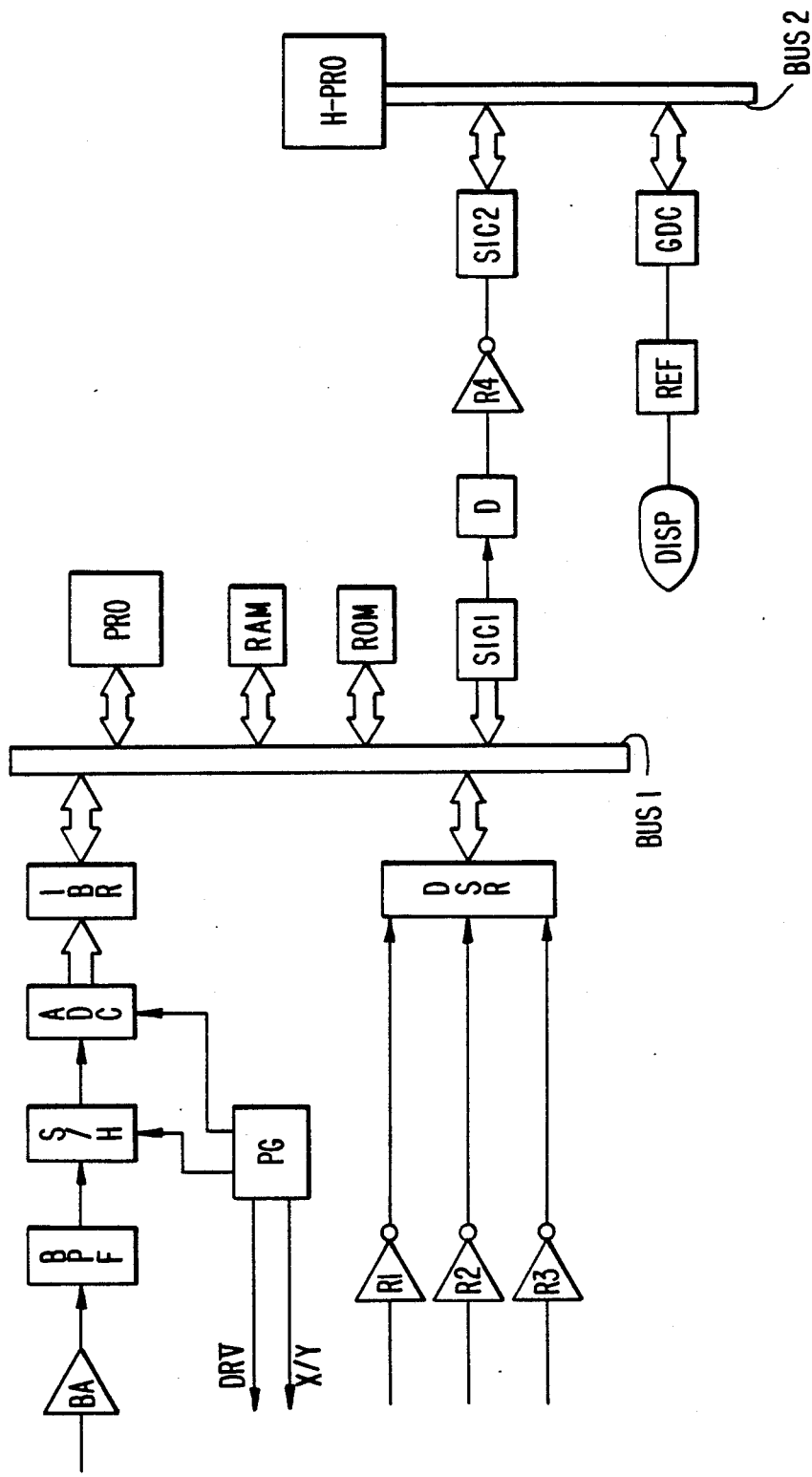
FIG. 5 is a schematic block diagram of the controller system of an electronic blackboard.

Contact points 16 and 17 are provided on the main unit 10 and the large area erasing unit 10", respectively, as can be seen in FIG. 2(b). These points contact each other and send a large eraser signal when the large area erasing unit 15 is attached to the main unit 10. Control of the electronic blackboard by these signals will be described hereinafter with respect to FIG. 5. Wiring for the contact points is also omitted from the figures for simplicity. Only a cable 55 to connect the eraser to a controller unit of the system or display unit is shown. It is preferable to make one or both of the contact points 16 or 17 in a ring form, to make them contact each other regardless of the rotational direction around the main unit in which the large area erasing unit is attached. If a point contacts are used, it is necessary to provide a guide on both erasing units to determine the direction of insertion.

When the large area erasing unit 10" is attached to the main unit 10, the small area eraser 12 is projected out slightly from the surface of the large area eraser 15, as can be seen in FIG. 2(b). When the large area eraser is pressed to the surface of the electronic blackboard, the small area eraser is pushed into the main unit 10 and the surface of the erasers become flat. The projection depends on the size of the large area eraser, and the margin of the space between the contact points 13 and 14. More details with respect to about this portion of the invention will be described later with respect to FIG. 4.

Figure 3:
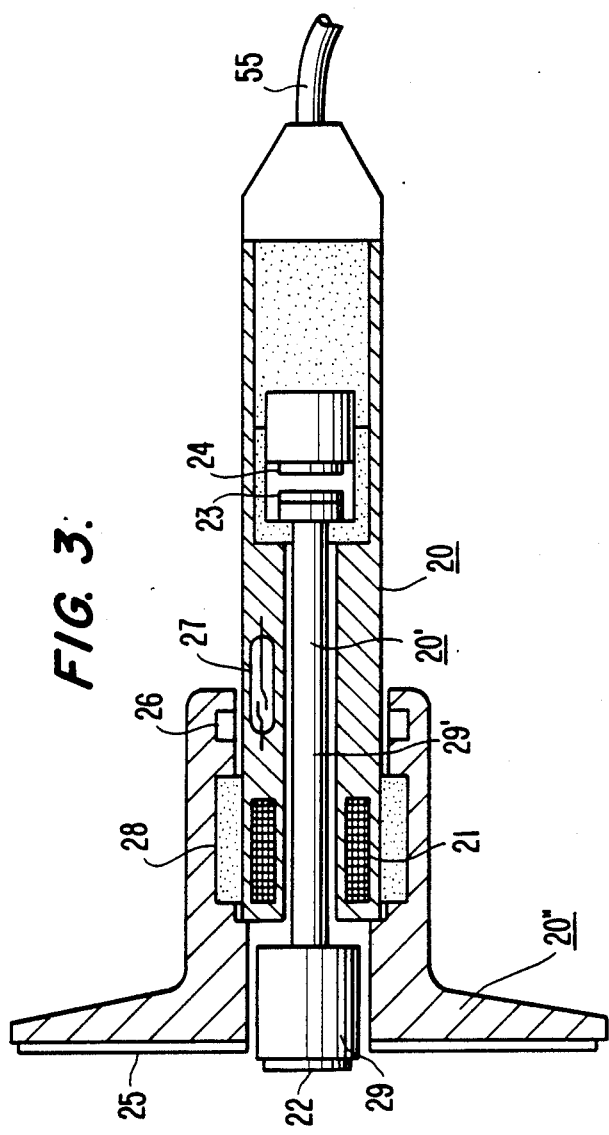
FIG. 3 is a cross-sectional view of an another embodiment of eraser according to the present invention illustrating its essential parts.

In the eraser as shown in FIG. 2, the contact points 16 and 17 are exposed. Resulting in problems of safety and reliability. An embodiment of the present invention which overcomes this problem is shown in FIG. 3. FIG. 3 shows a cross-sectional view of another eraser according the present invention to illustrate its construction.

FIG. 3 also shows the essential parts of the invention which comprises a main unit 20, a small area erasing unit 20′ and a large area erasing unit 20″. The main unit contains a coil 21 which detects the positional coordinates, a contact points 23 and 24, and a magnetic field sensible lead switch 27. Contact points 23 and 24 in the main unit 20 are separated from each other by separating device which may be a spring inserted in proper portion for which more details will be provided later with respect to FIG. 4. The small area erasing unit 20 comprises a small area eraser 22, attached to the surface of eraser head 29 and supported by a rod 29′ which is inserted into the main unit 20, and held in a similar manner as described with respect to FIG. 2. The large area erasing unit 20 comprises a large area eraser 25 attached to the surface of the unit and a permanent ring magnet 26. The large area eraser unit 20 is detachable from the main unit 20, to which it is engaged by an engagement device. In FIG. 3 it is held by the friction of a rubber ring 28 fitted on the inner surface of the large area eraser unit 20″ as shown in the figure.

The contact point 23 is pushed toward the contact point 24 by the rod 29′, when the eraser is pressed to a surface of a board to erase figures written on it. and the contact points 23 and 24 are closed to send an erasing signal that the eraser is in use. When the large area unit 20 is attached to the main unit 20, the lead switch 27 installed in the main unit 20 is closed by the magnetic field of the permanent magnet 26, and a signal that the large area erasing unit is in use is sent to the system controller. In FIG. 3, the wiring for the lead switch 27 also omitted for the sake of simplicity.

When the system controller receives the erasing signal, it blanks the portion of memory corresponding to the area of the small size eraser around the positional coordinates for the main unit 20, and the portion of the figure corresponding to the area of the small area eraser on the display unit is deleted. If the system controller further receives the signal that the large area eraser is in use, it further blanks the memory portions corresponding to the area of the large size eraser around the positional coordinate for the main unit 20. And on the display unit, a large area corresponding to the large area eraser is deleted, which corresponds to the area deleted on the surface of the electronic blackboard. More details of this erasing process will be described later with respect to FIG. 5.

The surface of the small area eraser 22 project out slightly from the surface the large area eraser 25 as shown in FIG. 3, similar to FIG. 2. More details of this projection will be described hereinafter with respect to FIG. 4.

In the erasers described above, the shape of the eraser may be any shape. However it is the most practical to use a circular erasing area, because the system controller only has to delete an area within a constant radius determined by the size of the eraser, around the point detected by the coordinate detecting coil. If for example a rectangular or some other shaped erasing area is used, it is necessary to provide additional means to detect the direction of the eraser touched on the surface of electronic board, where the shape of the eraser is determined beforehand.

Figure 4:
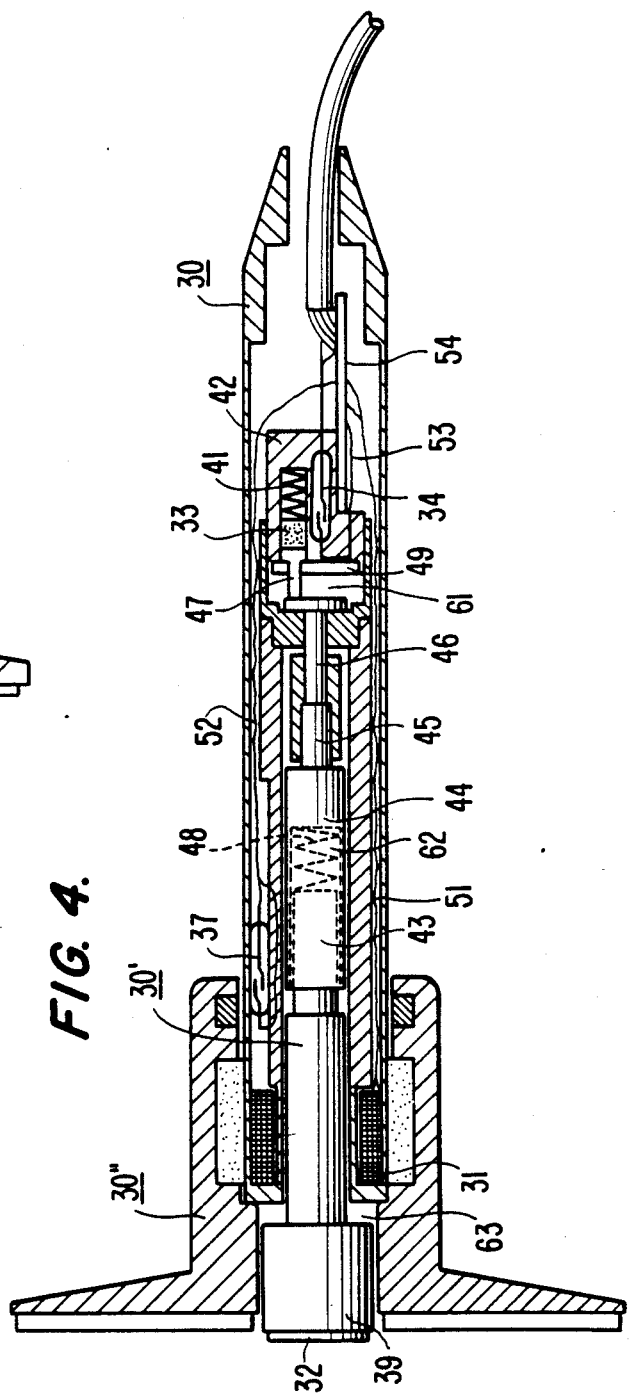
FIG. 4 illustrates details of still another embodiment of an eraser according to the present invention, showing a cross sectional view.

FIG. 4 shows still another embodiment of an eraser giving according to the present invention. FIG. 4 shows more details of the eraser, however the essential principles of the eraser are similar to the preceding embodiments, therefore, only some of the details and some of the points different from the preceding embodiments will be described.

The eraser comprises from main unit 30, small area erasing unit 30′ and large area erasing unit 30″. Function and performance of these units are all similar to that of FIGS. 2 and 3. The contact points for detecting the small area erasing unit 30′ have been replaced by a magnetic sensible lead relay 34 and a small permanent magnet 33. In the figure, wiring for the position detecting coil 31, lead relay 37 and 34 are shown respectively by 51, 52 and 53. The wires are passed through holes or spaces properly made in the main unit 30, bonded to a small terminal plate 54. and then wired to the multi-conductor cable 55. The terminal plate 54 is fixed properly to the main unit 30, and prevents the fine wires from breaking or becoming disconnected. The permanent magnet 33 is pressed by a spring 41 toward the far end away from the magnetic sensible lead relay 34, in a case 42 which accommodates the lead relay 34 and the spring 41. When the small area eraser 32 is touched to the surface of the board (not shown) to erase the figures written on it, the permanent magnet 33 is pushed toward the near side or closest side to the lead relay 34 in the case 42, as can be seen in FIG. 4. Then the lead relay 34 closes and sends a signal that the eraser is in use.

As can be seen in FIG. 4, the rod of the small area erasing unit 30′, which corresponds to the rod 19′ or 29′ in FIGS. 2 or 3, is made from plurality of rods or pistons and sleeves, each coupled to each other and which slide along the axis. Piston 43 is inserted into sleeve 44 and pressed toward the eraser head 39 by a spring 48. The means to support and prevent the piston 43 from sliding out of the sleeve 44 is not shown for the sake of simplicity, because it does not relate directly to the invention. The sleeve 44 is connected to rods 45 and 46 successively, which conduct the pressure at eraser 32 to the magnet 33 through a pin 47. The means to support or hold these parts properly is also omitted from the description for the sake of simplicity.

The gap 61 between the head of rod 46 and stopper 49 is narrower than the margin allowed for the spring 41 to shrink in the holder 42, to prevent the damage to magnet 33 when pressed by the small area eraser 32. The marginal space 62 between the end of the piston 43 and the bottom of the sleeve 44 where the spring 48 is inserted, is wider than the gap 61, so that a strong pushing stroke on the eraser head which is larger than the gap 61 is absorbed by the gap 62. Finally, the gap 63 between the back of eraser head 39 and the top of the main unit 30 is narrower, than the total width of gaps 61 and 62, so that a shock of a rough touching of the eraser to something is absorbed and the eraser is protected from damage.

The spring 48 is selected to have its elasticity stronger than that of spring 41. When the eraser is touched to the blackboard, therefore, the spring 41 is caused to shrink and the magnet 33 is moved first to activate (close) the lead relay 34. Further pressure is absorbed by the above-mentioned process. The process and function of the eraser is similar to the one explained with respect to FIG. 2 or 3.

One more note should be added with regard to the setting position of position detecting coil 11, 21 or 31. In the preceding embodiments, these coils were placed in the main unit 10, 20 or 30 respectively. They can be placed at any other place, for example in the head of small area erasing unit 19, 29 or 39. According to the experience of the inventors, there is an optimum distance from the surface of the board (more precisely from the X and Y coils). This is the distance where the accuracy of position detection is high, and errors due to the improper use of the eraser such as leaning of the eraser become a minimum. In the case shown in the figures, the above described position preferred is a position for the coordinate detection coils. More details about this condition have been disclosed in Japanese Laid Open Pat. No. Tokukaisho 56-147280 by T. Kohno, issued on Nov. 16, 1981.

Next it will be explained briefly how the the electronic blackboard is controlled by a control system. It the method is a common method and will be described briefly with respect to FIG. 5, which shows a block diagram of control system for an electronic blackboard.

A positional coordinate signal picked up by the coil 11, 21 or 31 in the forgoing figures is amplified by a buffer amplifier BA, filtered by a band-pass filter BPF, and then fed to a sample-hold circuit S/H. The sample-hold circuit S/H sends the signal to an analog to digital converter (A/D converter) ADC, synchronized to the period of a clock pulse generator PG. The A/D converter converts the input signal to a 12 bit signal, and loads it in a 12 bit input buffer resister IBR. On the other hand the signals sent from the contact points 13 and 14, 23 and 24 or lead switch 34, which indicate that the eraser is in use, are send to a first receiver R1. The signal sent from the contact points 16 and 17, or lead relay 27 or 37, which indicate that the large area erasing unit is in use, is received by a second receiver R2. The out put of these receivers are loaded in a device status resister DSR.

A processor PRO reads out the memory of device status resister DSR at a predetermined interval (usually about 10 msec) according to the processing program stored in read only memory ROM (capacity of which is about 32K bytes). When a flag is set indicating the "eraser is in use", the processor PRO reads out the signal in the input buffer register IBR and the signal in the device status resister DSR indicating the use or not of the large erasing unit, and stores same in a random access memory RAM, having a capacity of about 8K bytes. For the transportation of this data between PRO, DSR, RAM and ROM a first data bus BUS1 is used.

At the same time, the signals are converted into serial data by a first serial interface controller SIC1, and fed to a second serial interface controller SIC2 via a driver D, and a receiver R4 of a host processor H-PRO. The seconc serial interface controller SIC2 converts the input serial signal into a parallel signal and sends it out onto a second data bus BUS2.

A host processor H-PRO reads the data on the second data bus BUS2, and recognizes the area which is to be erased in the figure displayed on the display unit DISP. Then the host processor H-PRO sends out to the second data bus BUS2, the address corresponding to the area to be erased in a refresh memory REF, and the writing signal "0". The refresh memory stores the figure displayed on the display unit DISP.

The above-mentioned address is comprises an address which corresponds to a circular area having a center corresponding to the coordinate detected by the coil, and a radius corresponding to the size of the eraser used. These data are sent to the refresh memory REF via a graphic display controller GDC. In the refresh memory, the displayed data (drawing displayed) is written as "1", and replacing this data by "0" the displayed data to be erased.

Figure 1:
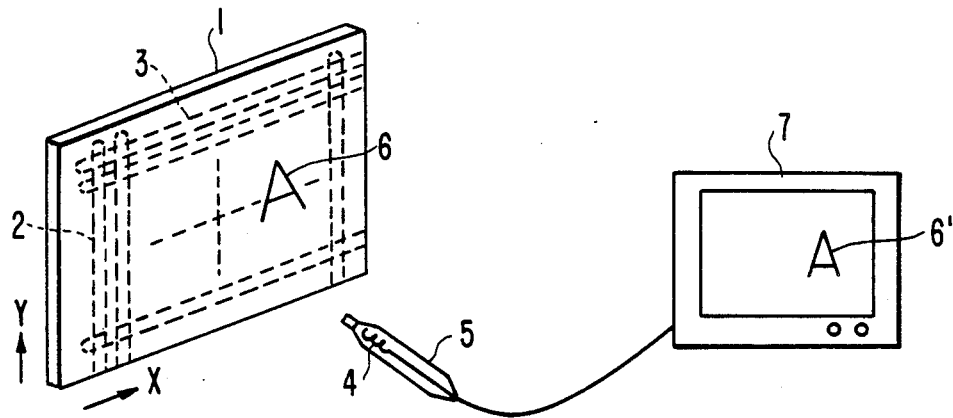
FIG. 1 is a schematic diagram illustrating a essential parts of a magnetic type electronic blackboard system, for explaining its construction and operation.

The clock pulse generator PG generates a signal to drive the X coils 2 and Y coils 3 of the electronic blackboard 1 shown in the FIG. 1. It also generates a signal X/Y to switch the X coil and Y coil. The signal from the coil 4 in the write pen 5 is also sent to the processor PRO. It is necessary, therefore, to distinguish a write an erase. For this purpose, the writing pen 5 is provided with a switch, which sends a signal indicating the writing pen is in use. This signal is sent to the device status resister DSR via a third receiver R3, and registered in a different bit position of the device statue register DSR. Thus the processor can distinguish the signals.

In the above disclosure of the present invention, the explanation has been made with respect to a magnetic type active board and passive pen type electronic blackboard. As will be clear as mentioned above, the spirit of the present invention is not limited to this type, but can be extended to any type of electronic blackboard with a slight modification which would be easy for one skilled in the art. For example by an replacing the X coil, Y coil and detection coil by appropriate electric coupler, such as a condenser plate for example, it is possible to realize an electrostatic type board. Replacement of passive board and active pen or eraser is also easy.

Moreover, it will be clear that many variations in the embodiments may be possible. For example, the position sensor and the magnetic sensible lead relay may be replaced by some other magnetic field sensors, such as Hall effect elements. The lead relays may be replaced any kind of detectors such as photo detector and light emitting diode, for example. The particular mechanical structure of the eraser which has been disclosed is also not essential for the invention. For instance the rod may be of any shape, the means to hold the large area erasing unit and the small area erasing unit in their proper position may be replaced by many alternatives. Further, the magnet mounted on the large area erasing unit needs not be a ring magnet. A modification such as eraser having a battery and transmitter in it, to eliminate the cable to connect the eraser by wireless transmission system is also possible.

These variations and modifications are all within the scope and spirit of the present invention. Accordingly, it should be understood that the embodiments as set forth in the explanation show the essential part and practical shape of the invention.

What is claimed is:

1. An eraser for an electronic blackboard system whih erases information being written on an input board and displayed or stored electronically on a display unit, said eraser comprising:

main means held by hand and for sending erasing signals to erase said information;

first means, attached to said main means, for corresponding to a relatively small area of said information;

second means, detachably engaged with said main means, for corresponding to a relatively larger area of said information compared to said first means;

position detecting means, in said main means, for detecting and sending signals corresponding to positional coordinates of said position detecting means, said position detecting means comprising a magnetic sensor;

first sensor means, in said main means, for detecting whether said eraser is contacting the surface of the input board and generating an in-use signal when said eraser is in use; and second sensor means, in one of said main means and said second means, for detecting whether said second means is attached to said main means and sending a second means in-use signal, designating an area for erasure to correspond to said larger area, when said second means is in use.

2. An eraser according to claim 1, wherein said main means includes a head portion and said magnetic sensor comprises a coil wound on the head portion of said main means.

3. An eraser according to claim 1, wherein said eraser further includes a rod and said first sensor means comprises contact points, one of which is coupled to said rod, and which contact points contact each other based on pressure conducted by the rod, when said eraser contacts the surface of the input board.

4. An eraser according to claim 1, wherein said eraser further includes an eraser head and a permanent magnet coupled to said eraser head, and said first sensor means comprises a magnetic sensor operated by the permanent magnet which is moved by pressure on said eraser head, when said eraser head contacts the surface of the input board;

5. An eraser according to claim 4, wherein said magnetic sensor comprises a magnetic sensible lead relay.

6. An eraser according to claim 1, wherein said second sensor means comprises contact points, provided respectively on said main means and said second means, which contact each other when said second means is attached to said main means.

7. An eraser according to claim 6, wherein at least one of said contact points has a ring shape and is formed around one of said main unit and said second means.

8. An eraser according to claim 1, wherein said second means includes a permanent magnet and said second sensor means comprises a magnetic sensor, installed in said main means and operated by the permanent magnet in said second means, when the second means is attached to said main means.

9. An eraser according to claim 8, wherein said magnetic sensor comprises a magnetic sensible lead relay.

10. An eraser according to claim 8, wherein said permanent magnet is ring shaped and formed around said second erasing unit.

11. An eraser according to claim 1, wherein said first and second means have erasing surfaces and the erasing surface of said first erasing means is projected from the erasing surface of said second means by a predetermined length when said second means is attached to said main means.

12. An eraser according to claim 1, wherein said first and erasing means include a circular erasing area a center of which coincides with a center of said position detecting means.

13. An eraser according to claim 1, wherein said main means has a cylindrical form.

14. An eraser according to claim 1, wherein said magnetic sensor comprises a Hall effect device.

15. An eraser according to claim 1, wherein at least one of said first and second sensor means comprise a photo sensor.

16. An eraser according to cliam 4, wherein said magnetic sensor comprises a Hall effect device.

17. An eraser according to claim 8, wherein said second sensor comprises a Hall effect device.

* * * * *

UNITED STATES PATENT AND TRADEMARK OFFICE
CERTIFICATE OF CORRECTION

PATENT NO. : 4,670,751                      Page 1 of 3

DATED : June 2, 1987

INVENTOR(S) : Shunji Enokido, Hideyuki Kodani, Hajime Ohta

It is certified that error appears in the above-identified patent and that said Letters Patent is hereby corrected as shown below:

```
In the Abstract [57]:
    Line 1, change ".  System" to --system--;
    Line 10, change "receive" to --receives--;
    Line 11, change "the memories" to --portions of a memory--.

Col. 2, line 8, change "emanation" to --emanating--;
        line 39, change "Simple" to --A simple--;
        line 42, change "increased" to --increase--;
        line 50, after "area" (first occurrence), insert --so
                that it can be used--; and after "erasing",
                insert --a--;
        line 52, after "for" insert --an--.

Col. 3, line 7, change "a" (second occurrence) to --the--;
        line 18, after "of" insert --an--;
        line 35, after "is" insert --to--;
        line 45, after "to" (second occurrence) insert --be--;
        line 48, delete "investigated was" and insert --is--;
                delete "is" insert --investigated was--.
        line 68, after "is" insert --preferable--.

Col. 4, line 2, delete "all";
        line 12, change "19" to --19'--;
        line 19, after "of" insert --the--;
        line 40, change "by" to --using--;
        line 48, delete "a";
        line 64, change ".  Resulting" to --resulting--.

Col. 5, line 10, change "20" to --20'--;
        line 15, change "20" to --20"--;
        line 17, change "20" to --20"--;
        line 24, delete ".";
        line 26, after "signal" insert --indicating--;
```

UNITED STATES PATENT AND TRADEMARK OFFICE
CERTIFICATE OF CORRECTION

PATENT NO. : 4,670,751

DATED : June 2, 1987

INVENTOR(S) : Shunji Enokido, Hideyjki Kodani, Hajime Ohta

It is certified that error appears in the above-identified patent and that said Letters Patent is hereby corrected as shown below:

```
Col. 5, line 27, change "20" to --20"--;
        line 31, after "27" insert --is--;
        line 48, change "project" to --projects--;
        line 65, delete "giving".

Col. 6, line 3, delete "from";
        line 13, delete ".".

Col. 7, line 7, change "preferred is a" to --is a preferred--;
        line 16, after "of" insert --a--;
        line 18, change "forgoing" to --foregoing--;
        line 35, change "memory" to --contents--;
        line 50, change "secone" to --second--;
        line 62, delete "is".

Col. 8, line 1, after "0" insert --causes--;
        line 40, change "needs" to --need--;
        line 51, change "whih" to --which--.

Col. 9, line 28, change ";" to --.--;
Col. 10, line 14, change "erasing unit" to --means--;
        line 17, delete "erasing";
        line 22, change "erasing" (first occurrence) to
                  --second--.
```

UNITED STATES PATENT AND TRADEMARK OFFICE
CERTIFICATE OF CORRECTION

PATENT NO. : 4,670,751

DATED : June 2, 1987

INVENTOR(S) : Shunji Enokido et al

It is certified that error appears in the above-identified patent and that said Letters Patent is hereby corrected as shown below:

In the Drawings:

In Fig. 4, the cable emerging from the main unit 30 should be indicated as reference number 55.

In the Specification:

Col. 7, line 13, "It the method" should read -- The method --.

Col. 8, line 13, "statue" should read -- status --.

Signed and Sealed this

Fifteenth Day of March, 1988

*Attest:*

DONALD J. QUIGG

*Attesting Officer*  *Commissioner of Patents and Trademarks*